(12) United States Patent
Sacks

(10) Patent No.: US 8,504,462 B2
(45) Date of Patent: *Aug. 6, 2013

(54) METHOD AND SYSTEM FOR USING CREDIT LINES TO ENHANCE THE DURABILITY OF SECURITIES PORTFOLIOS

(76) Inventor: Barry H. Sacks, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/291,033

(22) Filed: Nov. 7, 2011

(65) Prior Publication Data

US 2012/0209789 A1    Aug. 16, 2012

Related U.S. Application Data

(63) Continuation of application No. 11/502,318, filed on Aug. 9, 2006, now Pat. No. 8,055,566.

(60) Provisional application No. 60/707,119, filed on Aug. 9, 2005, provisional application No. 60/753,183, filed on Dec. 22, 2005.

(51) Int. Cl.
    *G06Q 40/00*    (2012.01)

(52) U.S. Cl.
    USPC .......................................... 705/36 R; 705/35

(58) Field of Classification Search
    USPC ...................................................... 705/36 R
    See application file for complete search history.

(56) References Cited

U.S. PATENT DOCUMENTS

| | | | | |
|---|---|---|---|---|
| 5,812,987 | A  * | 9/1998 | Luskin et al. | 705/36 R |
| 6,985,880 | B1 * | 1/2006 | Hodgdon et al. | 705/36 T |
| 2002/0147671 | A1 * | 10/2002 | Sloan et al. | 705/36 |
| 2005/0246260 | A1 * | 11/2005 | Hodgdon et al. | 705/36 |
| 2006/0015429 | A1 * | 1/2006 | Sullivan et al. | 705/35 |
| 2006/0074787 | A1 * | 4/2006 | Perg et al. | 705/35 |
| 2006/0089902 | A1 * | 4/2006 | Kim et al. | 705/38 |
| 2006/0293987 | A1 * | 12/2006 | Shapiro | 705/35 |
| 2007/0061237 | A1 * | 3/2007 | Merton et al. | 705/36 R |
| 2007/0061238 | A1 * | 3/2007 | Merton et al. | 705/36 R |
| 2007/0130035 | A1 * | 6/2007 | Carden | 705/35 |

* cited by examiner

*Primary Examiner* — Kirsten Apple
(74) *Attorney, Agent, or Firm* — West & Associates, A PC; Stuart J. West; Shaun Sluman

(57) ABSTRACT

A system and method for determining a desirous funding source and/or sources based upon at least one of user information, home information and portfolio information, wherein said desirous funding source(s) is/are based, at least in part, upon maximization of a user's assets.

9 Claims, 14 Drawing Sheets

METHOD AND SYSTEM FOR USING CREDIT LINES TO ENHANCE THE DURABILITY OF SECURITIES PORTFOLIOS

CLAIM OF PRIORITY

This application is a Continuation of U.S. patent application Ser. No. 11/502,318, filed Aug. 9, 2006, which will issue as U.S. Pat. No. 8,055,566 on Nov. 8, 2011, the complete contents of which are hereby incorporated by reference.

BACKGROUND

1. Field of the Invention

The present invention generally relates to management of securities portfolios used to provide distributions to retirees or to trust income beneficiaries. More specifically, the present invention relates to using credit lines to enhance the durability and increase the yield of these portfolios.

2. Related Art

For many current and soon-to-be retirees, social security benefits alone are not sufficient to cover all the expected expenses that are to be incurred during their retirement. For many trust income beneficiaries, increased income is desired but cannot be obtained without diminishing the amount left for the remainder beneficiaries. In addition, the anticipated life expectancy of retirees and beneficiaries has generally increased due to many factors. Therefore, retirees, beneficiaries and trustees are facing increasing pressure to increase the yields from their securities portfolios while making such portfolios last as long as possible. Conventional home equity credit lines (and other credit lines) are sometimes used to supplement retirement income or trust income, but there does not seem to be any systematic method to coordinate these credit lines with the retiree's or beneficiary's securities portfolio. Furthermore, there does not seem to be any systematic method to determine whether or when to use a reverse mortgage to replace a home equity credit line or other credit line. Reverse mortgages are sometimes considered as an alternative source of retirement distributions, although there does not seem to be any consideration of them as alternatives or supplements to trust income. In any case, conventional wisdom holds that reverse mortgages should be used as a last resort, to be drawn upon only after other resources, such as securities portfolios, have been largely or completely exhausted.

Hence, it would be desirable to provide a method and system to enhance the durability and increase the yield of securities portfolios used to provide distributions to retirees or beneficiaries, and in the case of such portfolios held by trusts, to increase, or at least maintain, the value of the trust remainder. Furthermore, it would be desirable to include in the method and system a way to use various kinds of credit lines, comprising conventional home equity credit lines and reverse mortgage credit lines, to provide the greatest economic advantage to the retiree or trust beneficiary while also providing the greatest flexibility and preservation of options for the longest period of time during the retiree's or beneficiary's remaining lifetime.

DETAILED DESCRIPTION

Figure 1:
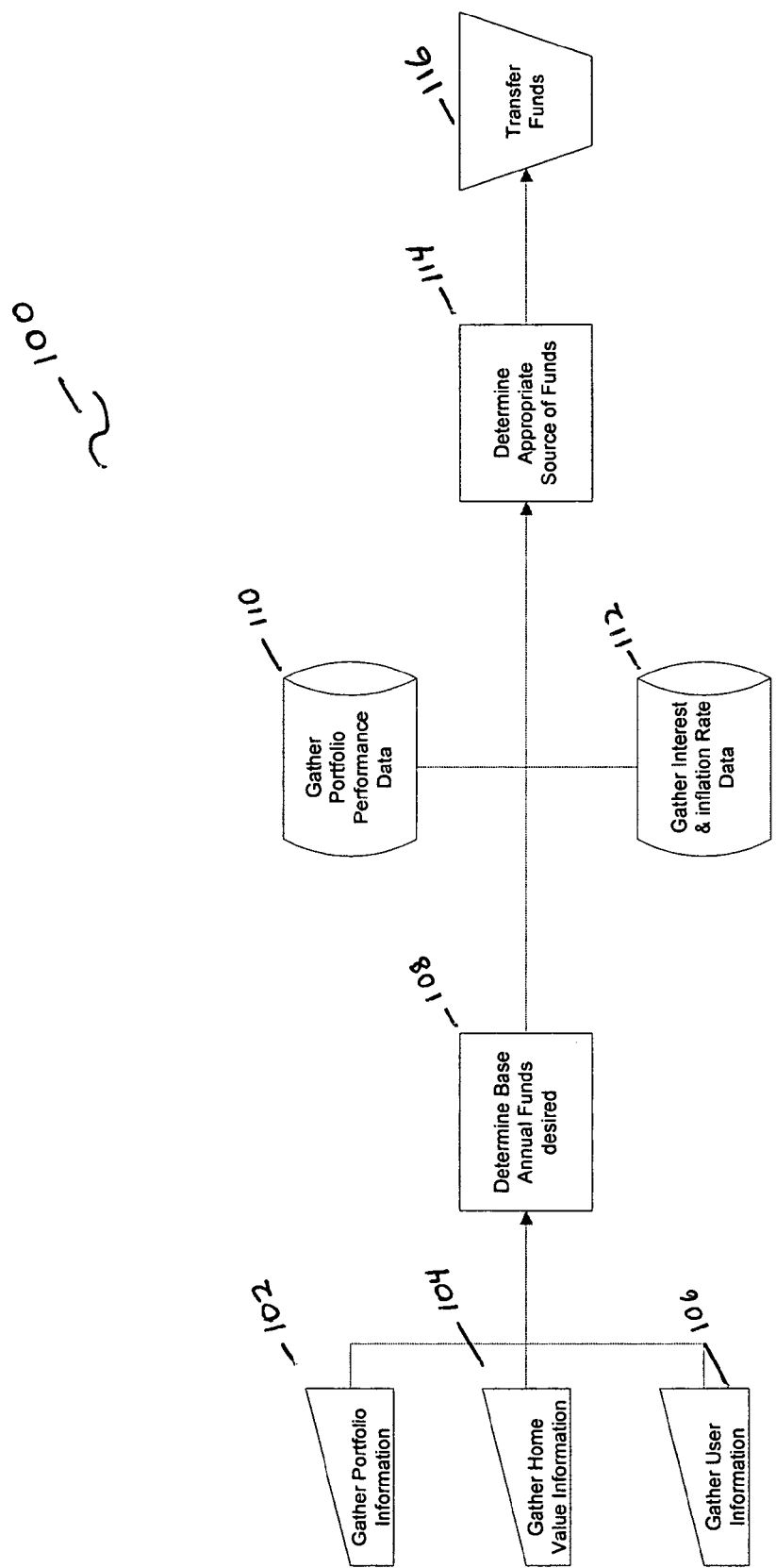
FIG. 1 depicts an overview flowchart of a system for using credit lines to enhance the durability of securities portfolios.

FIG. 1 depicts an embodiment of a system 100 for determining an appropriate source or sources of funds for a desired purpose. In the embodiment shown in FIG. 1, in step 102, information regarding a portfolio can be gathered. Such information can include types and quantities of stocks, bonds, bank accounts and/or any other security and/or financial record and/or financial vessel.

In step 104, home value information can be gathered. Home value information can include any relevant information concerning the market value of a person's home and/or homes. Such information can include estimated market value, cost, current loan balances secured by the home, and/or any other financial data related to the home.

In step 106, user information can be gathered. User information can include any relevant information regarding the user and/or the user's spouse. In some embodiments the information can include, age, gender, current assets (both liquid and non-liquid), anticipated life span, current spending habits, desired duration of funds, total net worth, health, anticipated problems and/or expenses, and/or any other desired information regarding the user and/or the user's spouse.

In step 108, the information gathered in steps 102, 104 and 106 can be combined in any known and/or convenient manner to determine the base annual funds desired by a user and/or his/her spouse. In one embodiment a simple percentage of current spending can be used. However, in alternate embodiments any known and/or convenient system and/or method can be used to determine the base annual funds desired. Moreover, in some embodiments, the determination of base annual funds desired can be arbitrarily selected without reference to one or more of the sets of information gathered in steps 102, 104 and/or 106.

In step 110, the system 100 can gather information regarding performance history and projected performance of the portfolio and/or any/all of its constituent members. Such information can be obtained in any known and/or convenient manner. In some embodiments, the information can be manually obtained/entered and/or it can be automatically retrieved. Moreover, in some embodiments, the information can be estimated.

In step 112, the system 100 can gather information regarding interest rates and inflation rates. Such information can be obtained in any known and/or convenient manner. In some embodiments, the information can be manually obtained/entered and/or it can be automatically retrieved. Moreover, in some embodiments, the information can be estimated.

In step 114, the system 100 can determine the appropriate source or sources from which a user should draw funds to meet the annual funds desired. The system 100 can employ any known and/or convenient system and/or method to determine the appropriate funds sources. In some embodiments, the system 100 can base funding source decisions on past/present financial performance, predicted financial performance, past/current interest rates, predicted interest rates, past/current inflation rates, predicted inflation rates and/or any other desired criterion and/or criteria.

In step 116, funds can be transferred from the desired funding sources. Such transfers can be performed in any known and/or convenient manner. In some embodiments, the user and/or his/her agent can cause the transfer(s) to be implemented. However, in alternate embodiments, the system 100 can automatically cause the desired transfer(s) to be implemented.

Figure 2:
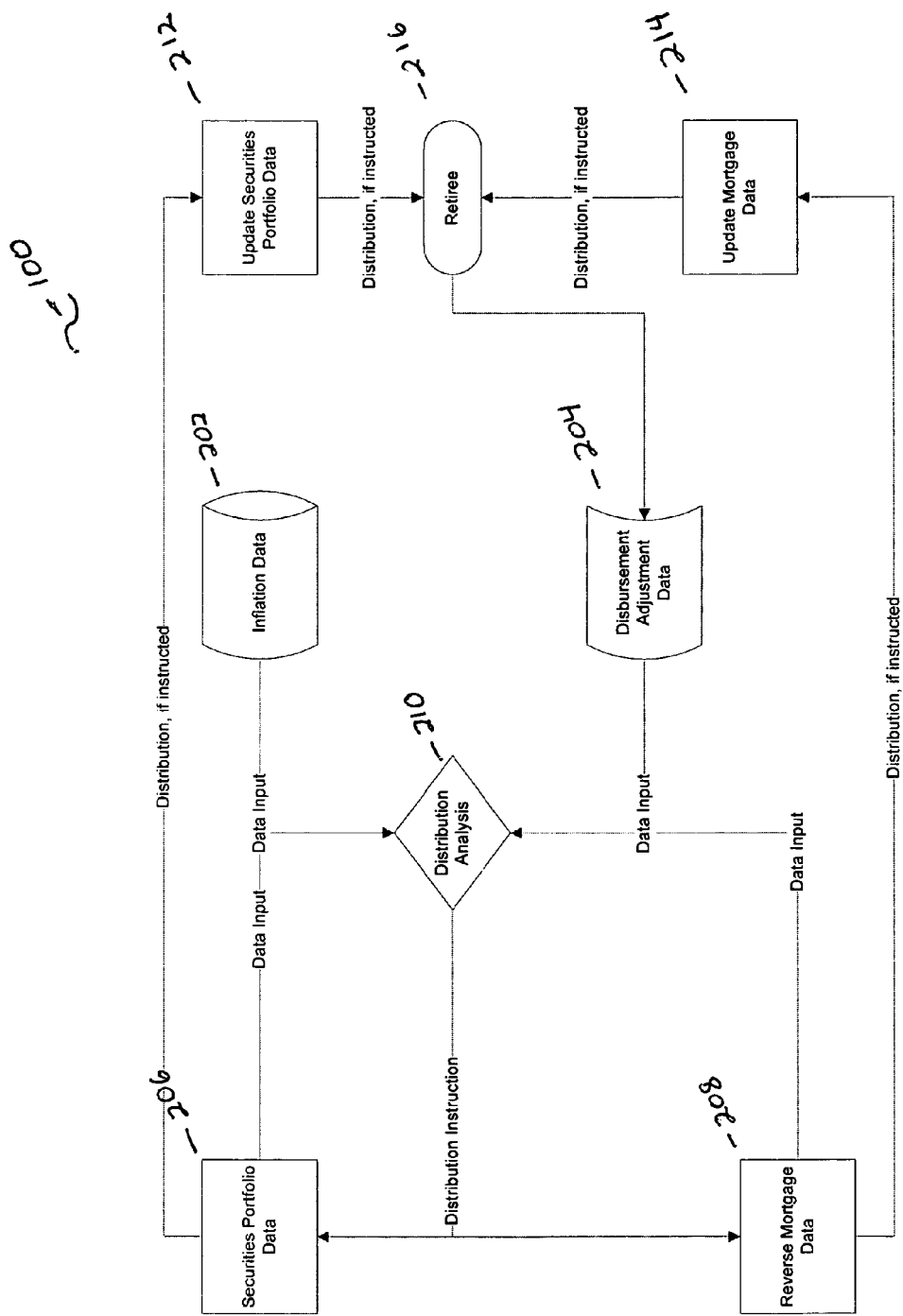
FIG. 2, depicts an embodiment of a system for using credit lines to enhance the durability of securities portfolios.

FIG. 2 depicts an alternate embodiment of the system 100 described in FIG. 1. In the embodiment shown in FIG. 2, inflation data 202, disbursement adjustment data 204, securities portfolio data 206 and reverse mortgage data 208 can be gathered and delivered to a distribution analysis engine 210. In some embodiments the data 202, 204, 206, 208 can be manually entered and/or can be automatically gathered. However, in alternate embodiments, the data 202, 204, 206, 208 can be collected and delivered to the distribution analysis engine 210 in any known and/or convenient manner.

In the embodiment shown in FIG. 2, the distribution analysis engine 210 determines whether funds should be disbursed from the securities portfolio, from the reverse mortgage and/or both. In some embodiments, the analysis can make this determination based solely on the historical profitability of the securities portfolio 206, based on the available credit under the reverse mortgage 208 and/or a combination of any known, obtainable and/or convenient information. Any known and/or convenient system and/or method to determine appropriate allocation of funds can be used.

Upon determination of the appropriate source(s) of funds, funds can be disbursed and the securities data can be updated 212 and/or the reverse mortgage data can be updated 214, depending upon the source of the funds and the funds can be delivered to recipient.

Additionally, in some embodiments, the recipient 216 can update the disbursement adjustment data 204 and the cycle can be repeated. The cycle can be repeated at any convenient intervals. In some embodiments, the interval can be one year, one month, one week, one day and/or any other convenient and/or desired interval.

Figure 3:
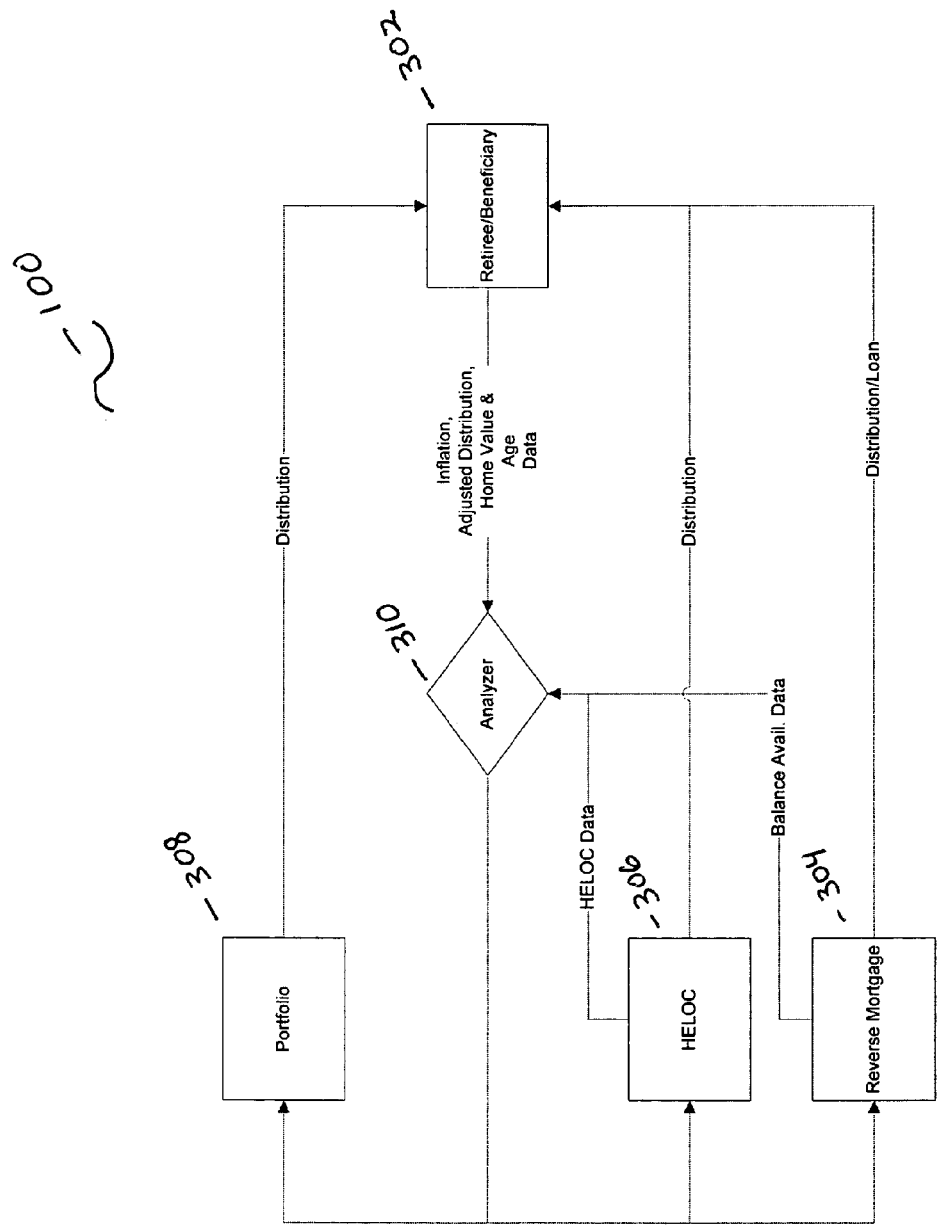
FIG. 3 depicts an alternate embodiment of a system for using credit lines to enhance the durability of securities portfolios.

As shown in FIG. 3, the system 100 includes a securities portfolio 308 owned by a retiree or trust income beneficiary 302, a line of credit 304 secured by the retiree's or trust income beneficiary's home (i.e., a conventional home equity line of credit), or by other assets, or by a reverse mortgage on the retiree's or income beneficiary's principal or secondary residence, and an analyzer 310.

The retiree or trust income beneficiary 302 receives distributions, generally in regular periodic amounts. The amounts of these distributions will typically be adjusted at regular intervals (annually, quarterly or at some other frequency) for inflation, but will not be adjusted for the investment performance of the portfolio. The source of these distributions will be the securities portfolio 308, or the line of credit 306, or both, in proportions determined by the analyzer 310, at the beginning of each time period. The term "time period" as used here and elsewhere in this application means a year, a quarter, or any other predetermined time period.

The analyzer 310 determines the proportions, as between the securities portfolio 308 and the line of credit 306, on the basis of information it receives. The analyzer 310 receives various types of information comprising, for example, investment performance of the securities portfolio 308 during the preceding time period, the inflation-adjusted amounts to be paid to the retiree or beneficiary 302 as distributions during the current time period, and the limits on the amount that can be drawn from the line of credit 306 during the current time period. Furthermore, additional information that may be used by the analyzer 310 includes the required minimum distribution, if the securities portfolio 308 is in a 401(k) account or an individual retirement account ("IRA"), information about the retiree's tax bracket, etc.

In one aspect, the analyzer 310 makes its determination as follows. At the beginning of each time period, the investment performance of the securities portfolio 308 for the preceding time period is examined. If the performance is negative, the current time period's distributions are then to be made entirely from the line of credit 306. Notwithstanding the foregoing determination, however, if the amount available from the line of credit 306 is insufficient to make the entire payment, then only the amount that is available from the line of credit 306 is to be used, and the remainder of the payments are to be made from the securities portfolio 308.

On the other hand, if the investment performance of the securities portfolio 308 is positive, and the amount of investment return is greater than or equal to the current time period's distribution, the current time period's distribution is then to be made entirely from the securities portfolio 308.

If the investment performance of the securities portfolio 308 is positive, but the amount of the investment return is less than the amount of the current time period's distribution, the amount of the investment return is drawn from the securities portfolio 308, and the remainder of the time period's distribution is drawn from the line of credit 306 (subject to the availability of the line of credit 306 as noted above).

The analyzer 310 has an additional function, which is described as follows. In most cases in which the present invention would be used, the line of credit to be drawn from in the early years of the retiree's retirement or the trust beneficiary's tenure would be a conventional home equity line of credit (often referred to as a "HELOC"). That is because the typical HELOC has a lower interest rate and lower initial fee than a reverse mortgage line of credit. However, a HELOC generally has a limited duration and a limit on the amount that can be borrowed. When either limit is reached, repayment of the credit line debt is generally required to begin.

The obligation to repay the credit line debt could impose an economic burden on the retiree or trust beneficiary, which might force him or her to sell the home. An alternative to selling the home would be the use of a reverse mortgage to replace the HELOC, as a so-called "take-out" loan. (A reverse mortgage requires no repayment so long as the borrower continues to occupy the home.) Generally, the maximum amount that can be borrowed under a reverse mortgage is substantially lower than the amount that can be borrowed under a HELOC. Therefore, if the retiree or trust beneficiary desires to use a reverse mortgage to replace the HELOC, that decision would have to be made at or before the time that the HELOC debt reaches the maximum amount available under the reverse mortgage. That amount, however, changes over time; it is a function of the borrower's age and of the value of his or her home at the time the reverse mortgage is taken. Thus, as part of the additional function of the analyzer 310, the analyzer 310 regularly receives information about the amount of the outstanding HELOC debt, and about the value of the retiree's or trust beneficiary's home. The analyzer 310 then uses the information about age and home value to obtain information on the maximum amount available to the retiree or trust beneficiary from a reverse mortgage. The analyzer 310 also tracks, on a regular periodic basis, the amount of the outstanding HELOC debt. Whenever the amount of the outstanding HELOC debt approaches a predetermined percentage of the maximum amount available under a reverse mortgage, the analyzer 310 informs the retiree or trust beneficiary and/or his or her financial advisor. The retiree or trust beneficiary, and/or his or her financial advisor can then examine the overall financial situation and decide on the appropriate course of action.

As described above, the present invention uses the line of credit 306 coordinated with the securities portfolio 308, rather than separate from, or after the exhaustion of, the securities portfolio 308. The use of a line of credit 306 coordinated with a securities portfolio 308 can have exceptionally favorable results in enhancing the durability and value of the securities portfolio 308 in later years. This is especially true if it is used in situations where the securities portfolio 308 has negative investment performance during the early years of a retiree's retirement, or trust beneficiary's tenure.

There are significant advantages to using a HELOC, rather than a reverse mortgage, in the early years of the retiree's retirement or the trust beneficiary's tenure. The HELOC's lower interest rate and lower initial fee have the result that the cumulative debt against the borrower's home will be lower at any future time than if a reverse mortgage had been taken instead of the HELOC. It is very likely that there would be many years in the time period before the cumulative debt under the HELOC would reach the maximum amount available under a reverse mortgage. During the intervening time period, several options remain open. And, even if the HELOC is replaced by a reverse mortgage at the end of such time period, the cumulative debt will be significantly lower than if the reverse mortgage (instead of the HELOC) were taken initially.

In one implementation, the present invention is implemented using software in the form of control logic, in either an integrated or a modular manner. The control logic may reside on a computer-readable medium executable by a computer or processor. Alternatively, hardware or a combination of software and hardware can also be used to implement the present invention. Based on the disclosure and teachings provided herein, a person of ordinary skill in the art will know of other ways and/or methods to implement the present invention.

Figure 4:
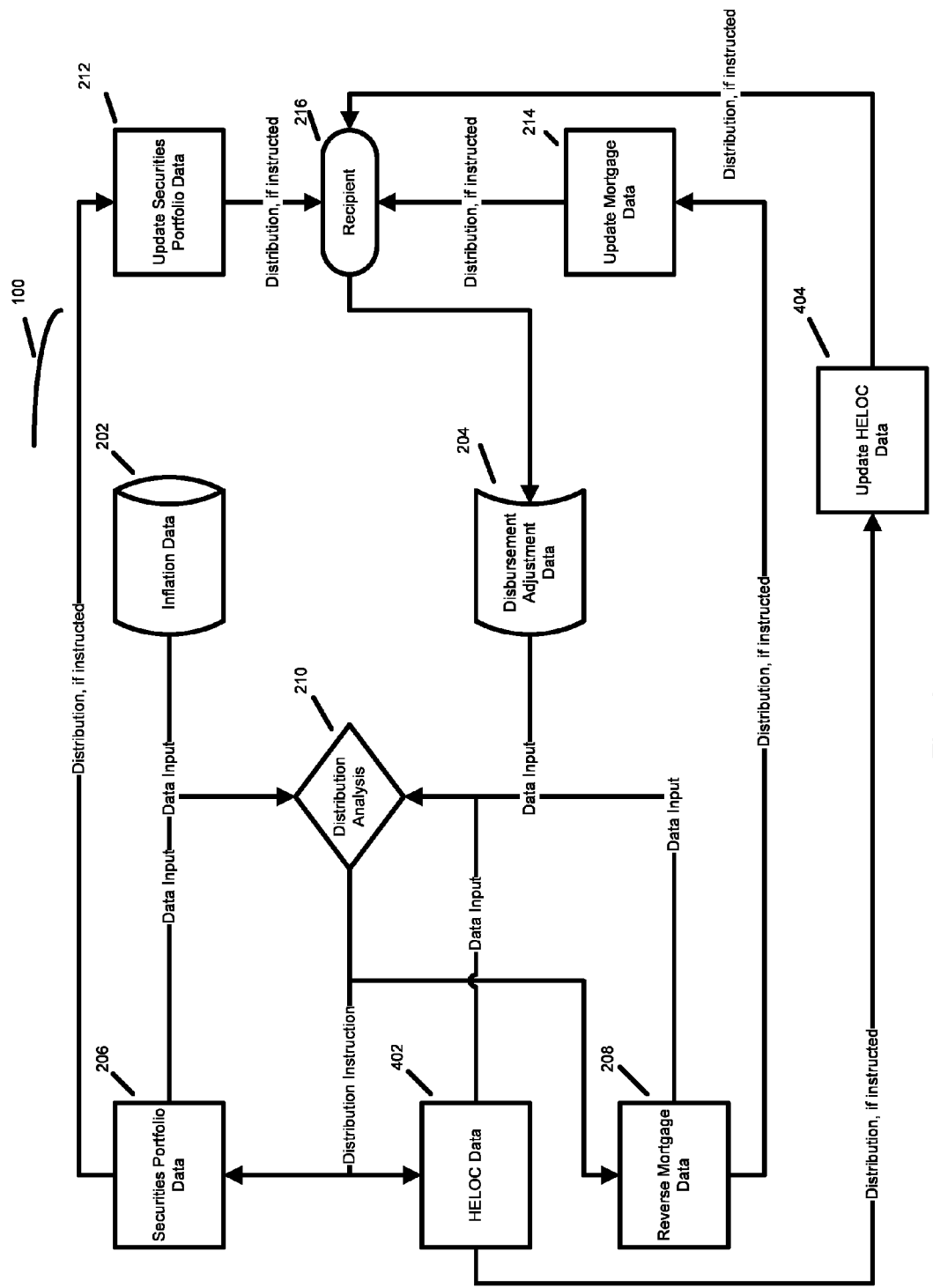
FIG. 4 depicts an alternate embodiment of a system for using credit lines to enhance the durability of securities portfolios.

FIG. 4 depicts an alternate embodiment of the system 100 described in FIG. 2. In the embodiment shown in FIG. 4, inflation data 202, disbursement adjustment data 204, securities portfolio data 206, reverse mortgage data 208 and HELOC data 402 can be gathered and delivered to a distribution analysis engine 210. In some embodiments the data 202, 204, 206, 208, 402 can be manually entered and/or can be automatically gathered. However, in alternate embodiment, the data 202, 204, 206, 208, 402 can be collected and delivered to the distribution analysis engine 210 in any known and/or convenient manner.

In the embodiment shown in FIG. 4, the distribution analysis engine 210 determines whether funds should be disbursed from the securities portfolio, from the reverse mortgage, the HELOC and/or any two or more of them. In some embodiments, the distribution analysis engine can make this determination based solely on the historical profitability of the securities portfolio 206, based on the available credit under the reverse mortgage 208, based solely upon relative interest rates of the reverse mortgage 208 and the HELOC, based solely upon available credit under the HELOC and/or a combination of any known, obtainable and/or convenient information related to one or more of the securities portfolio data 206, reverse mortgage data 208 and the HELOC data 402. Any known and/or convenient system and/or method to determine appropriate allocation of funds can be used.

Upon determination of the appropriate source(s) of funds, funds can be disbursed and the securities data can be updated 212, the reverse mortgage data can be updated 214, and/or the HELOC data can be updated 404, depending upon the source of the funds and the funds can be delivered to recipient.

Additionally, in some embodiments, the recipient 216 can update the disbursement adjustment data 204 and the cycle can be repeated. The cycle can be repeated at any convenient intervals. In some embodiments, the interval can be one year, one month, one week, one day and/or any other convenient and/or desired interval.

Figure 5:
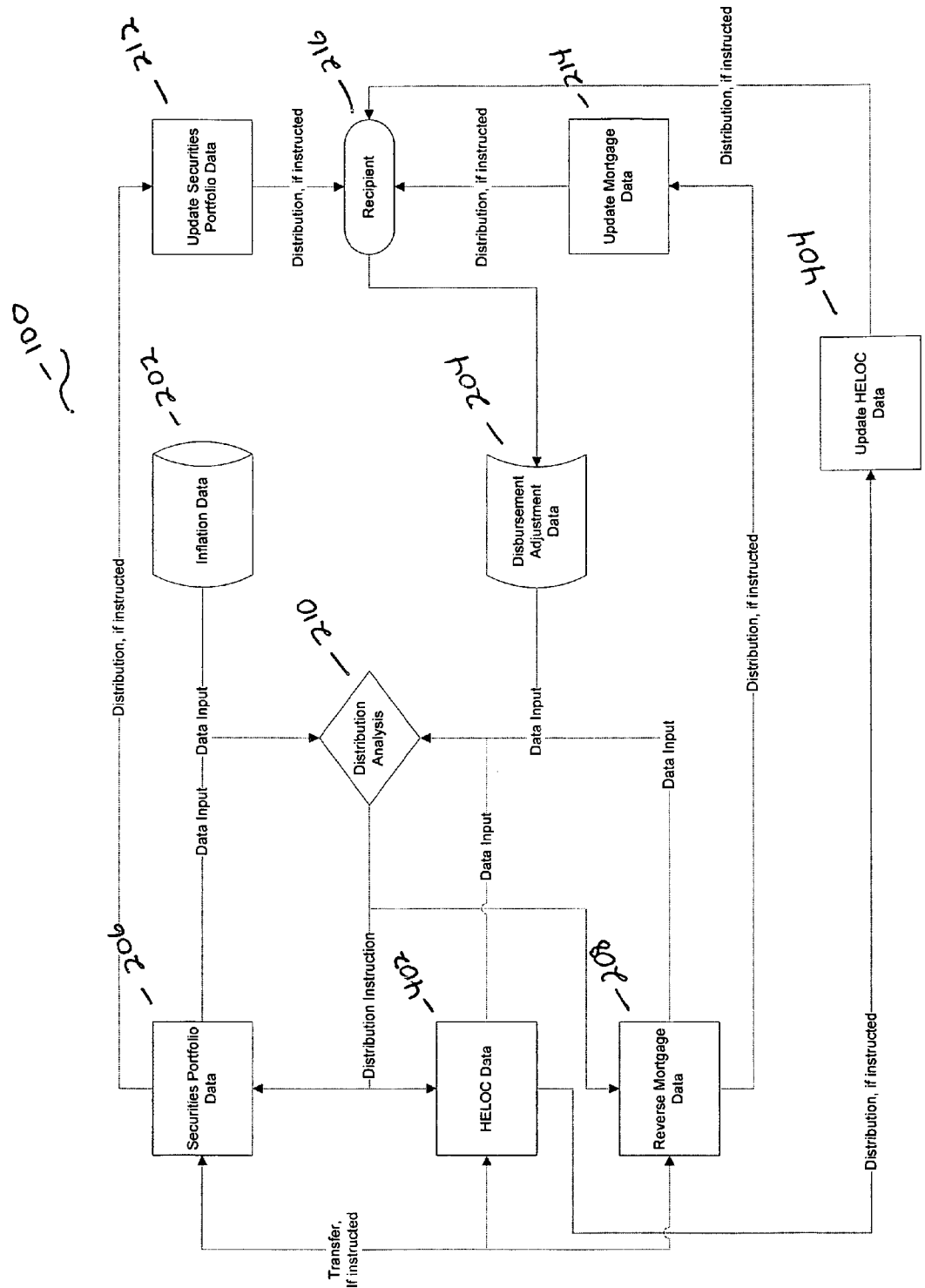
FIG. 5 depicts an alternate embodiment of a system for using credit lines to enhance the durability of securities portfolios.

FIG. 5 depicts an alternate embodiment of the system 100 described in FIG. 4. In the embodiment shown in FIG. 5, inflation data 202, disbursement adjustment data 204, securities portfolio data 206, reverse mortgage data 208 and HELOC data 402 can be gathered and delivered to a distribution analysis engine 210. In some embodiments the data 202, 204, 206, 208, 402 can be manually entered and/or can be automatically gathered. However, in alternate embodiments, the data 202, 204, 206, 208, 402 can be collected and delivered to the distribution analysis engine 210 in any known and/or convenient manner.

In the embodiment shown in FIG. 5, the distribution analysis engine 210 determines whether funds should be disbursed from the securities portfolio, from the reverse mortgage, the HELOC and/or any two or more of them and whether funds should be transferred between the securities portfolio 206, reverse mortgage 208 and/or HELOC 402. In some embodiments, the analysis can make these determination based solely on the historical profitability of the securities portfolio 206, based on the available credit under the reverse mortgage 208, based solely upon relative interest rates of the reverse mortgage 208 and the HELOC, based solely upon available credit under the HELOC and/or a combination of any known, obtainable and/or convenient information related to one or more of the securities portfolio data 206, reverse mortgage data 208 and the HELOC data 402. Any known and/or convenient system and/or method to determine appropriate allocation of funds can be used.

Upon determination of the appropriate source(s) of funds, funds can be disbursed and/or transferred and the securities data can be updated 212, the reverse mortgage data can be updated 214, and/or the HELOC data can be updated 404, depending upon the source of the funds and the funds can be delivered to the recipient.

Additionally, in some embodiments, the recipient 216 can update the disbursement adjustment data 204 and the cycle can be repeated. The cycle can be repeated at any convenient intervals. In some embodiments, the interval can be one year, one month, one week, one day and/or any other convenient and/or desired interval.

Figure 6:
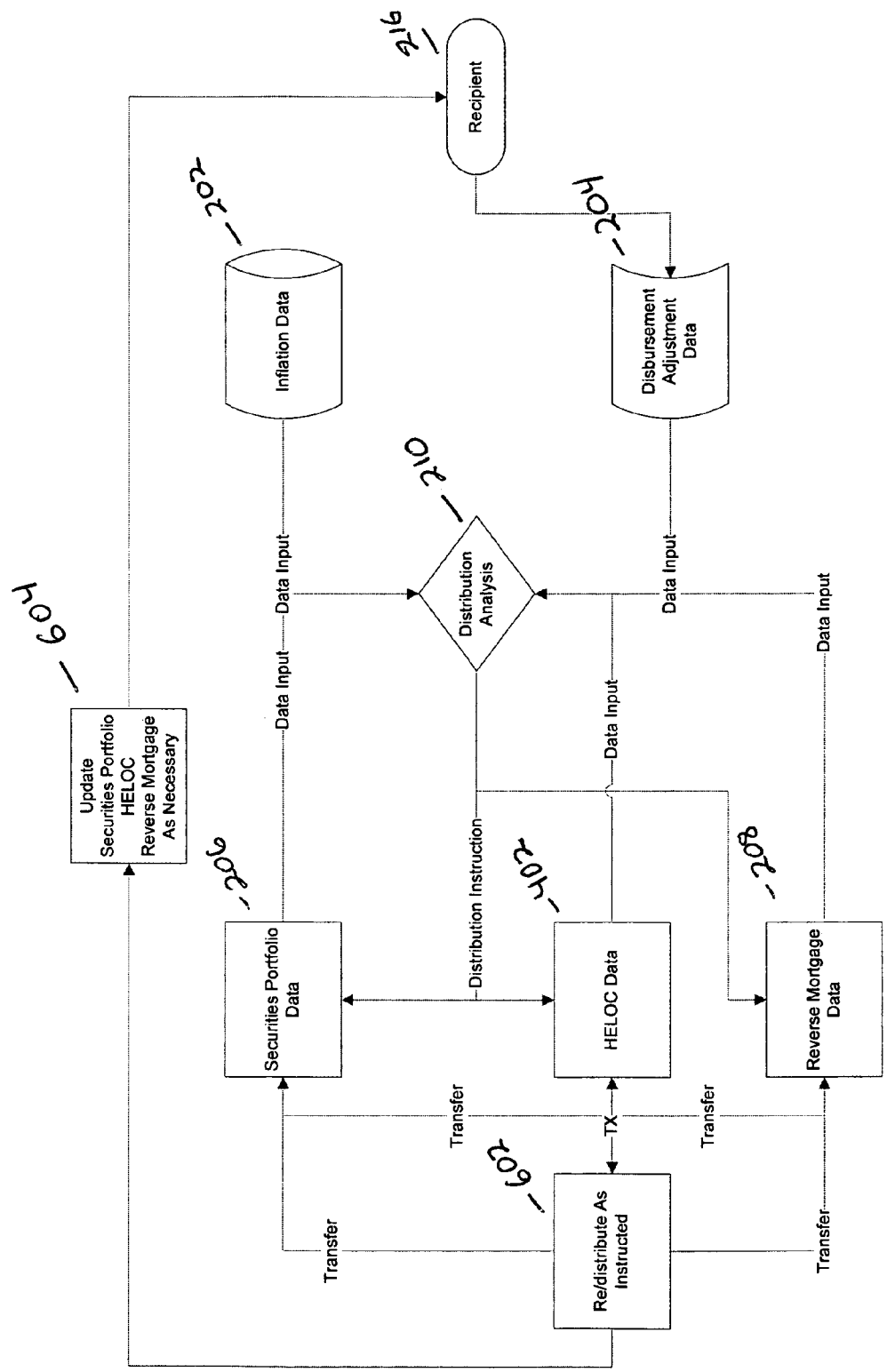
FIG. 6 depicts an alternate embodiment of a system for using credit lines to enhance the durability of securities portfolios.

FIG. 6 depicts an alternate embodiment of the system 100 described in FIG. 4. In the embodiment shown in FIG. 5, inflation data 202, disbursement adjustment data 204, securities portfolio data 206, reverse mortgage data 208 and HELOC data 402 can be gathered and delivered to a distribution analysis engine 210. In some embodiments the data 202, 204, 206, 208, 402 can be manually entered and/or can be automatically gathered. However, in alternate embodiments, the data 202, 204, 206, 208, 402 can be collected and delivered to the distribution analysis engine 210 in any known and/or convenient manner.

In the embodiment shown in FIG. 6, the distribution analysis engine 210 determines whether funds should be disbursed from the securities portfolio, from the reverse mortgage, the HELOC and/or any two or more of them and whether funds should be transferred between the securities portfolio 206, reverse mortgage 208 and/or HELOC 402. In some embodiments, the analysis can make these determination based solely on the historical profitability of the securities portfolio 206, based on the available credit under the reverse mortgage 208, based solely upon relative interest rates of the reverse mortgage 208 and the HELOC, based solely upon available credit under the HELOC and/or a combination of any known, obtainable and/or convenient information related to one or more of the securities portfolio data 206, reverse mortgage data 208 and the HELOC data 402. Any known and/or convenient system and/or method to determine appropriate allocation of funds can be used.

Upon determination of the appropriate source(s) of funds, funds can be disbursed and/or re/transferred 606 and the securities data can be updated 212, the reverse mortgage data can be updated 604, and/or the HELOC data can be updated 404, depending upon the source of the funds, and the funds can be delivered to recipient.

Additionally, in some embodiments, the recipient 216 can update the disbursement adjustment data 204 and the cycle can be repeated. The cycle can be repeated at any convenient intervals. In some embodiments, the interval can be one year, one month, one week, one day and/or any other convenient and/or desired interval.

Figure 7:
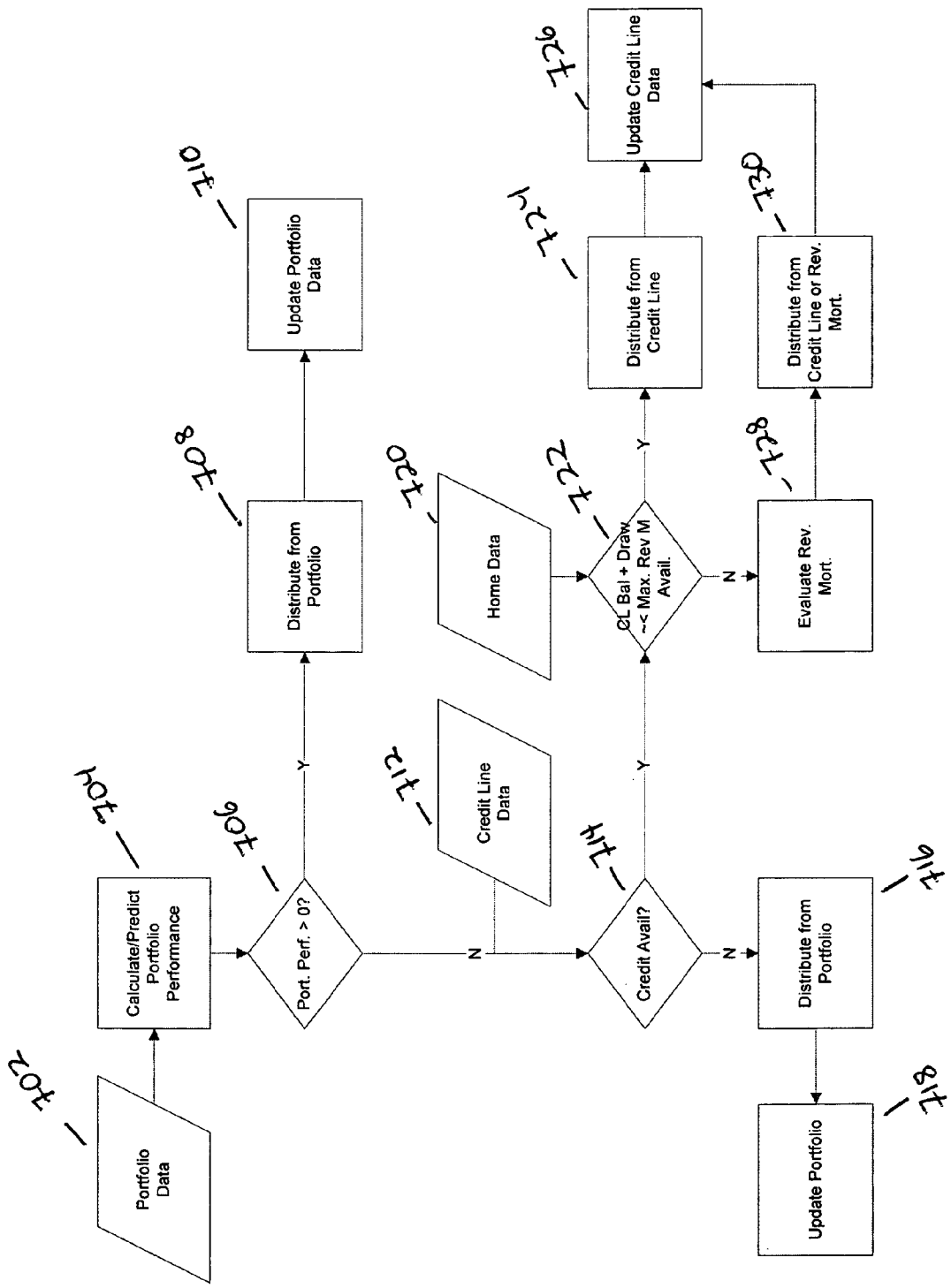
FIG. 7 depicts an embodiment of a method for determining distribution ratios.

FIG. 7 depicts an embodiment of a method for determining distribution ratios. In the embodiment shown in FIG. 7, portfolio data 702 is gathered and used to calculate/predict the portfolio performance 704. In the embodiment shown in FIG. 7, Monte Carlo simulations can be used to calculate predicted outcomes. However, in alternate embodiments, any known and/or convenient system and/or method can be employed to determine predicted outcomes, which can be employed with any of the embodiments previously described.

In step 706, portfolio performance is evaluated over the preceding desired interval. If portfolio performance is positive (in excess of zero), distribution will be made from the portfolio 708 and the portfolio data will be updated 710 for use in future iterations. If portfolio performance is negative (zero or below zero), information regarding the available credit line data can be obtained 712.

In step 714, the credit line data is evaluated. If the credit line data 712 indicates that no credit is available, distribution of funds will be made from the portfolio 716 and the portfolio data will be updated 718 for use in future iterations.

If in step 714, the credit line data 712 indicates that credit is available, home data is collected and/or retrieved 720. If the sum of the desired distribution plus the current balance-owed on the credit line is below a predefined threshold percentage of the maximum reverse mortgage available, then distribution can be made from the line of credit 724 and the credit line data can be updated 726 for use in future iterations. If the sum of the desired distribution plus the current balance owed on the credit line meets and/or exceeds a predefined threshold percentage of the maximum reverse mortgage available, then evaluation and/or use of a reverse mortgage is advised 728 and credit line data and reverse mortgage data can be updated 730 for use in future iterations.

Figure 8:
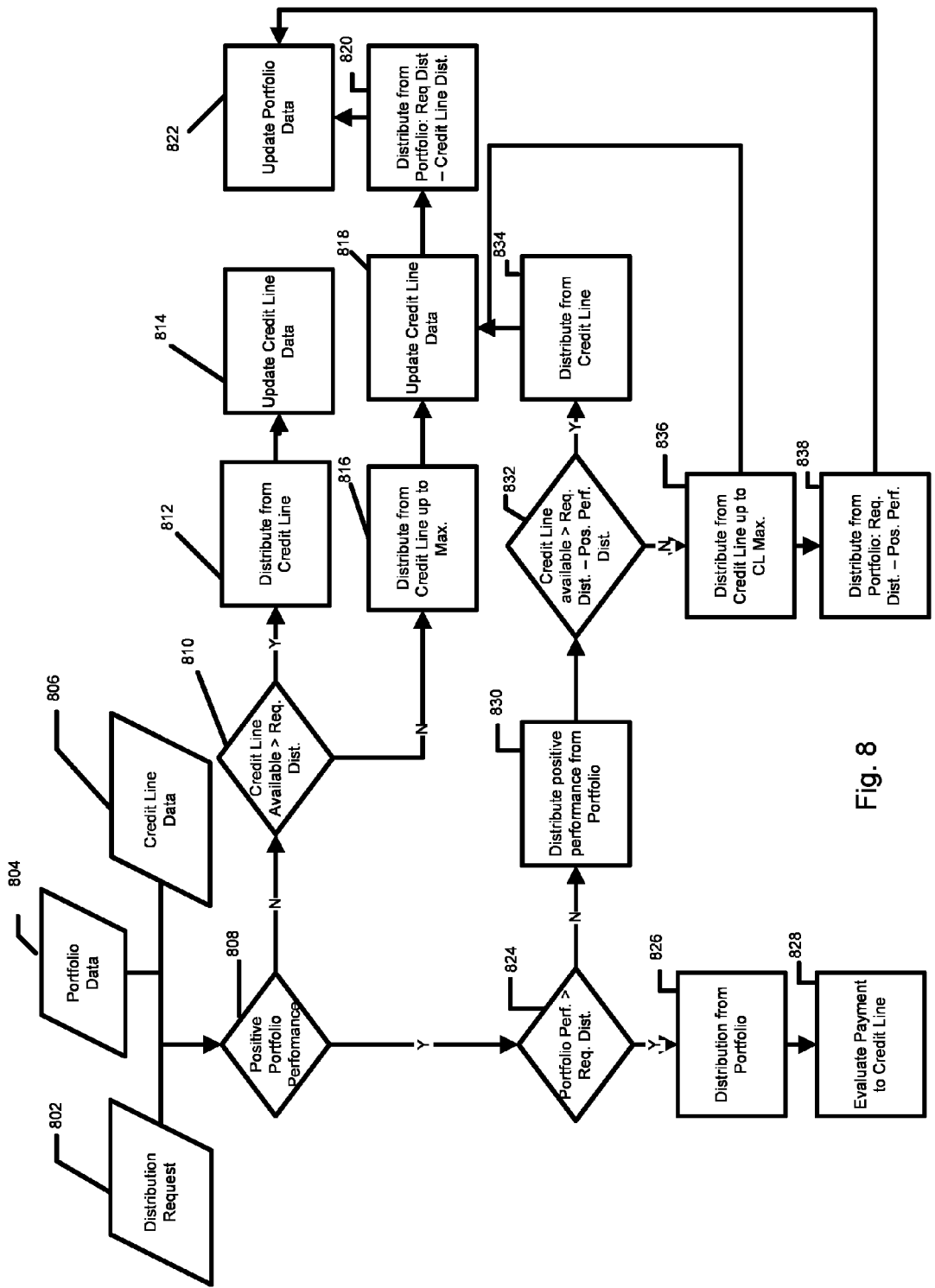
FIG. 8 depicts an embodiment of a method for determining distribution ratios.

FIG. 8 depicts an alternate embodiment of a method for determining distribution ratios, which can be employed with any of the embodiments previously described. In the embodiment shown in FIG. 8, data regarding a distribution request 802, portfolio data 804 and credit line data 806 can be retrieved. In step 808, portfolio performance can be evaluated. If portfolio performance is determined to be negative, the available credit in the credit line is compared 810 to the distribution request 802. If the available credit exceeds the distribution request, the distribution can be made from the credit line 812 and the credit line data can be updated 814 for use in future iterations. If the credit available does not exceed the distribution request, a distribution from the credit line up to the maximum credit available can be made 816 and the credit line data can be updated for use in future iterations. Additionally, a distribution can be made from the portfolio in an amount equal to the requested distribution minus the previously made credit line distribution. 820. Then, the portfolio data can be updated 822 for use in future iterations.

If in step 808 it is determined that the portfolio exhibited positive performance over the preceding interval, then an evaluation 824 is made comparing the portfolio performance to the requested distribution. If the portfolio performance over the preceding interval is greater than the requested distribution, the distribution can be made from the portfolio 826 and the portfolio data can be updated. Additionally, an evaluation 828 can be made to determine if payment towards an outstanding credit line is advisable. Any known and/or convenient system and/or method can be used to determine if such a payment is advisable.

If in step 824, it is determined that the portfolio performance over the preceding interval does not exceed the requested distribution, then all positive performance of the portfolio is distributed 830 and the portfolio data is updated. Next, an evaluation of the available credit as compared to the requested distribution and portfolio performance is conducted 832. If the available credit is greater than the requested distribution minus the previously distributed positive portfolio performance, then the balance of the requested distribution 834 can be made from the credit line and the credit line data can be updated 818. If the credit available does not exceed the requested distribution minus the previously distributed positive portfolio performance, then the remaining credit on the credit line (up to the maximum credit limit) can be distributed 836 and the credit line data can be updated 818. Additionally, the balance of the distribution (requested distribution minus distribution from credit line minus previous distribution from portfolio of positive performance) can be made from the portfolio 838 and the portfolio data can be updated for future use 822.

Figure 9:
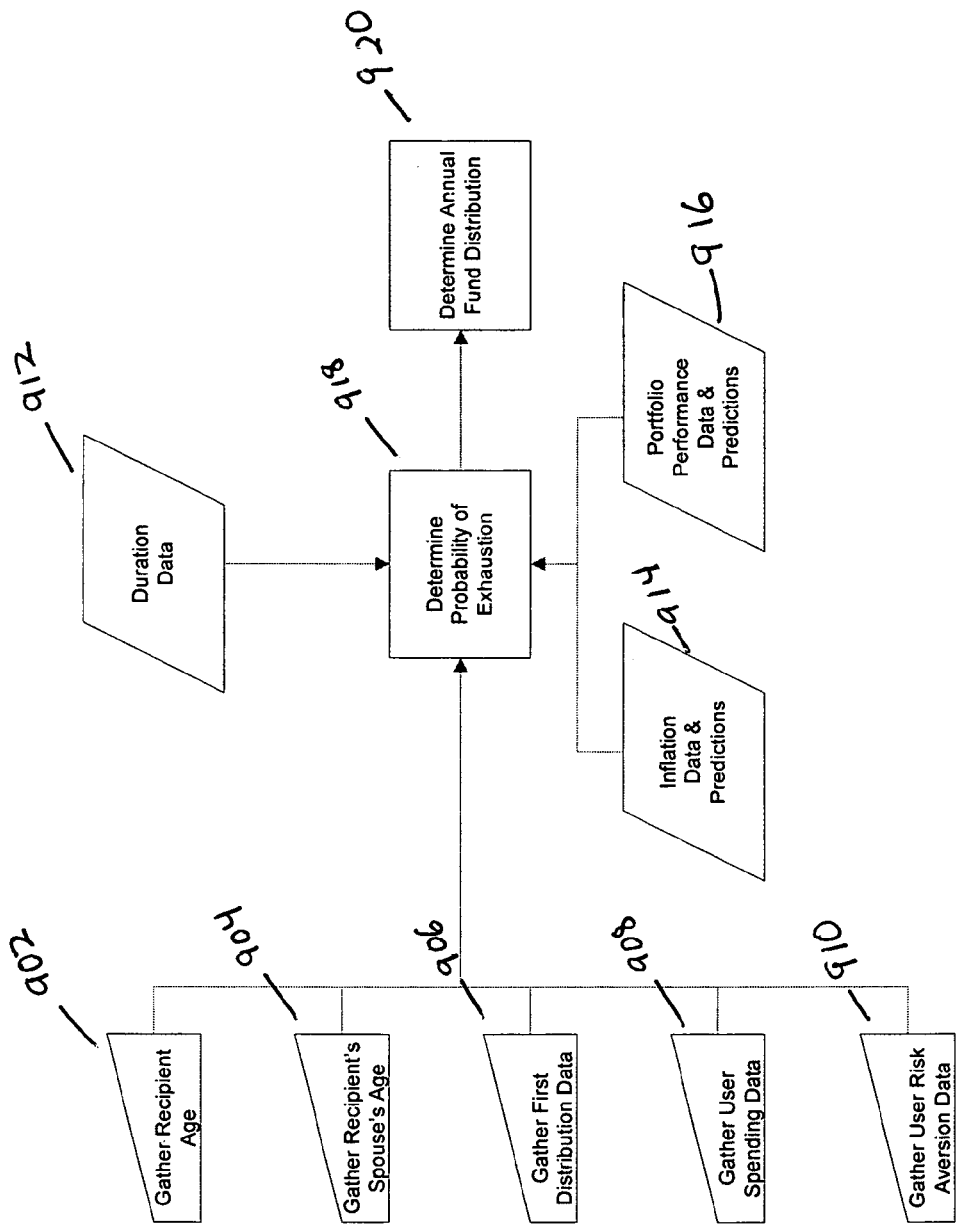
FIG. 9 depicts an embodiment of a method for determining annual fund distribution.

FIG. 9 depicts an embodiment of a method for determining annual fund distribution. In the embodiment shown in FIG. 9, various information is gathered comprising: Age 902, Spouse's age 904, First distribution data 906, User Spending data 908 and User risk aversion data 910. First distribution data 906 can be information relating to any previous distributions and/or a desired first distribution amount. User spending data 908 can be based on any user input, an average of user's previous spending and/or can be based on any known and/or convenient input. User risk aversion data 910 can be determined in any know and/or convenient manner, such as questionnaire results and/or direct inquiry.

The gathered data 902, 904, 906, 908, 910 can then be combined with duration data 912 (related to the desired outlook period), inflation data and predictions 914 and portfolio performance data and predictions 916 to determine 918a probability that a user's portfolio would be exhausted over the duration based on the spending data as influenced by various market factors. Based on the determined probability of exhaustion 918, any known and/or convenient method and/or system can be employed to determine a desired annual fund distribution 920.

Figure 10:
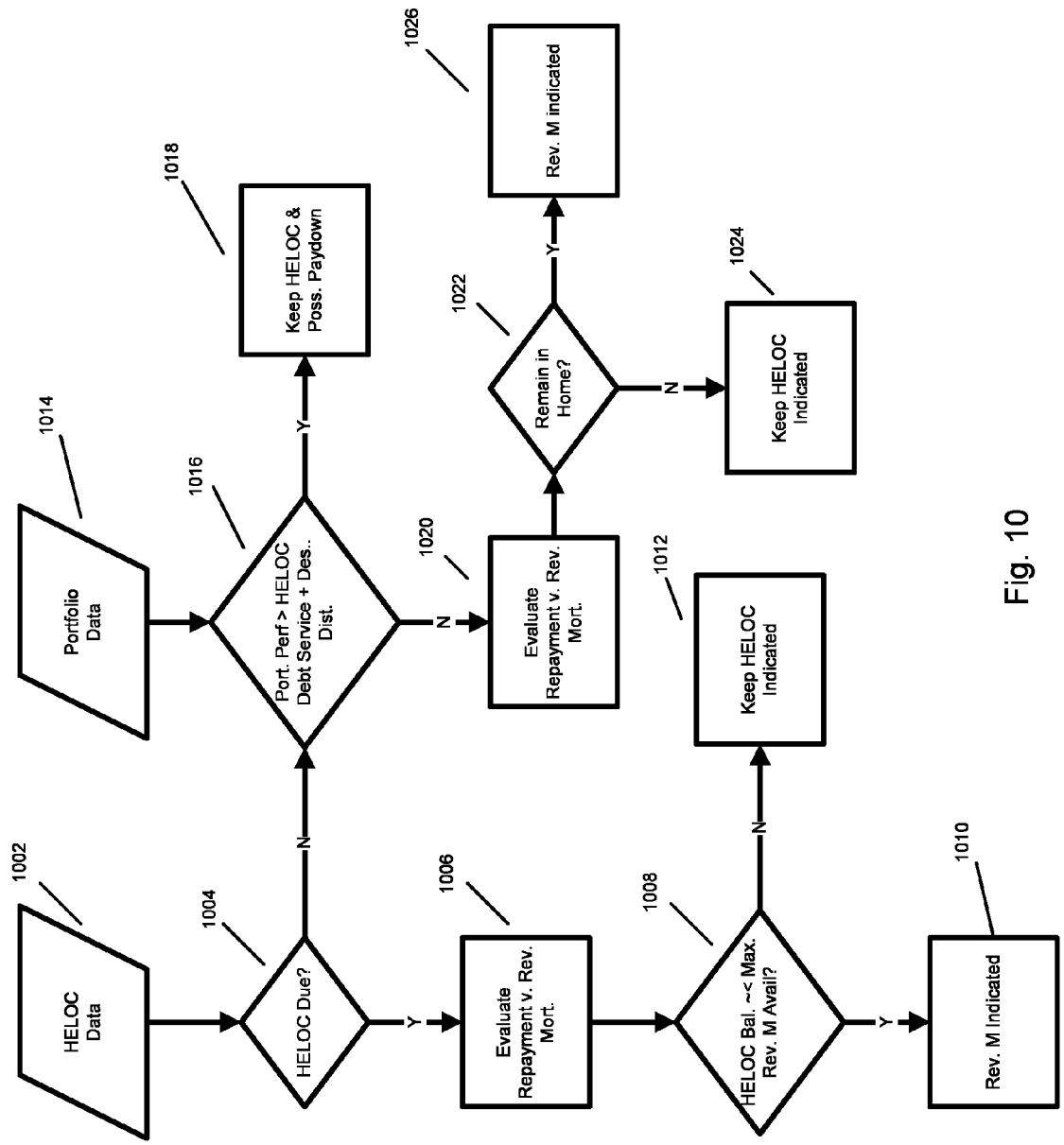
FIG. 10 depicts an embodiment of a method for determining funding sources.

FIG. 10 depicts an embodiment of a method for determining funding sources. In step 1002 HELOC data is obtained and a determination 1004 is made as to whether, based on the terms of the HELOC, the HELOC balance is due. If the evaluation reveals that the HELOC balance is due, an evaluation 1006 is performed to determine if repayment and/or refinancing of the HELOC to a reverse mortgage could be appropriate. In step 1008, the HELOC balance is evaluated to determine if it below the maximum available reverse mortgage. If the HELOC balance is at or below the maximum available reverse mortgage, then refinancing the HELOC to a reverse mortgage is indicated 1010 as appropriate. If the HELOC balance is above the maximum available reverse mortgage, then maintaining the existing HELOC 1012 and making appropriate payment on the HELOC is indicated as appropriate.

If in step 1004 it is determined that the HELOC is not currently due, then portfolio data 1014 is retrieved and an evaluation is made in step 1016 to determine if the positive portfolio performance during the preceding interval is greater than the HELOC debt service plus the desired distribution. If the positive portfolio performance during the preceding interval is greater than the HELOC debt service plus the desired distribution, then the system can indicate that maintenance of the HELOC is indicated and that payments towards the HELOC could be advisable 1018. If the positive portfolio performance during the preceding interval is not greater than the HELOC debt service plus the desired distribution, then the system can evaluate 1020 the options of repaying the HELOC and refinancing the HELOC by a reverse mortgage. In step 1022 it is determined whether a user intends to remain in the home subject to the HELOC. If the user does not intend to remain in the home, then maintenance of the HELOC is advisable 1024. If the user intends to remain in the home, then refinancing the HELOC by a reverse mortgage is indicated as advisable 1026.

Figure 11:
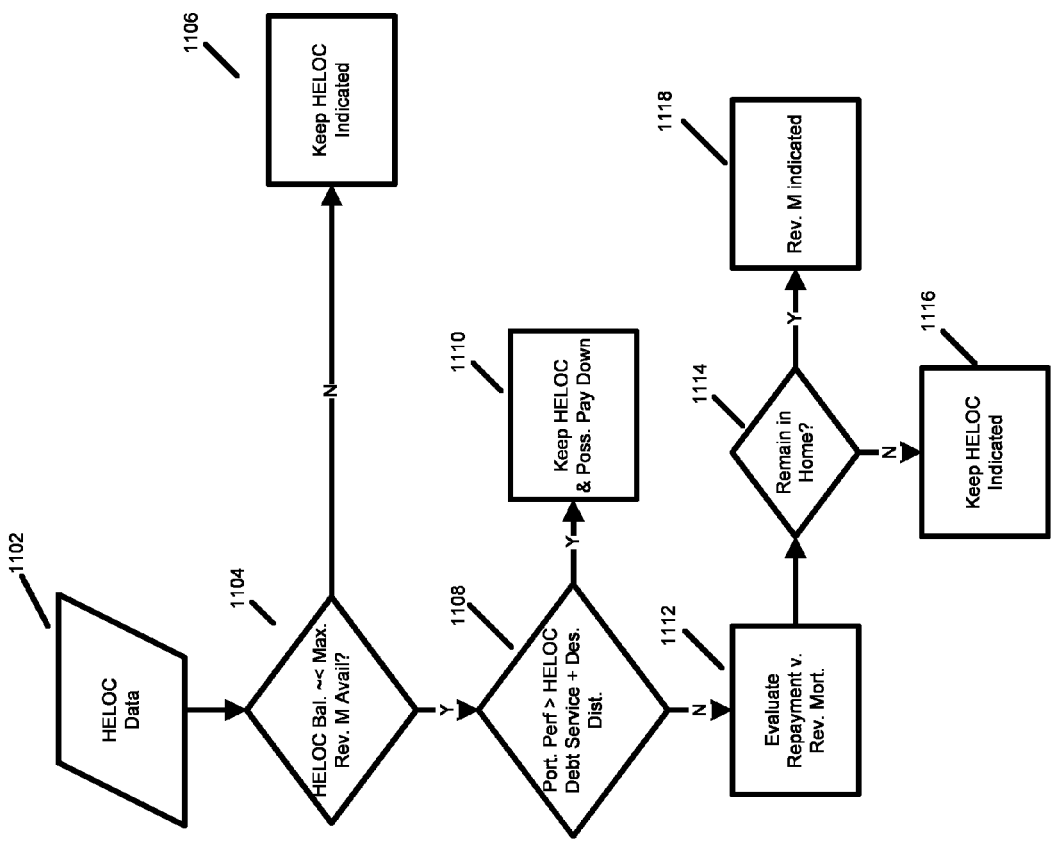
FIG. 11 depicts an embodiment of a method for determining funding sources.

FIG. 11 depicts an alternate embodiment of a method for determining funding sources. In step 1102, HELOC data is collected and in step 1104 the HELOC data is evaluated against the maximum reverse mortgage available. If the HELOC balance is greater than a predefined percentage of the maximum reverse mortgage available, then maintenance of the HELOC is indicated as advisable 1106. If in step 1104 it is determined that the HELOC balance is at or below a predefined percentage of the maximum available reverse mortgage, then a second evaluation in step 1108 can be triggered.

In step 1108, the portfolio performance is compared with the HELOC debt service plus the desired distribution. If portfolio performance is greater than the HELOC debt service plus the desired distribution, it can be indicated that maintenance of the HELOC 1110 and possible paying down of the HELOC is advisable. If portfolio performance is not greater than the HELOC debt service plus the desired distribution, then the system can evaluate 1112 the options of repaying the HELOC and refinancing the HELOC by a reverse mortgage. In step 1114 it is determined whether a user intends to remain in the home subject to the HELOC. If the user does not intend to remain in the home, then maintenance of the HELOC is advisable 1116. If the user intends to remain in the home, then refinancing the HELOC by a reverse mortgage is indicated as advisable 1118.

Figure 12:
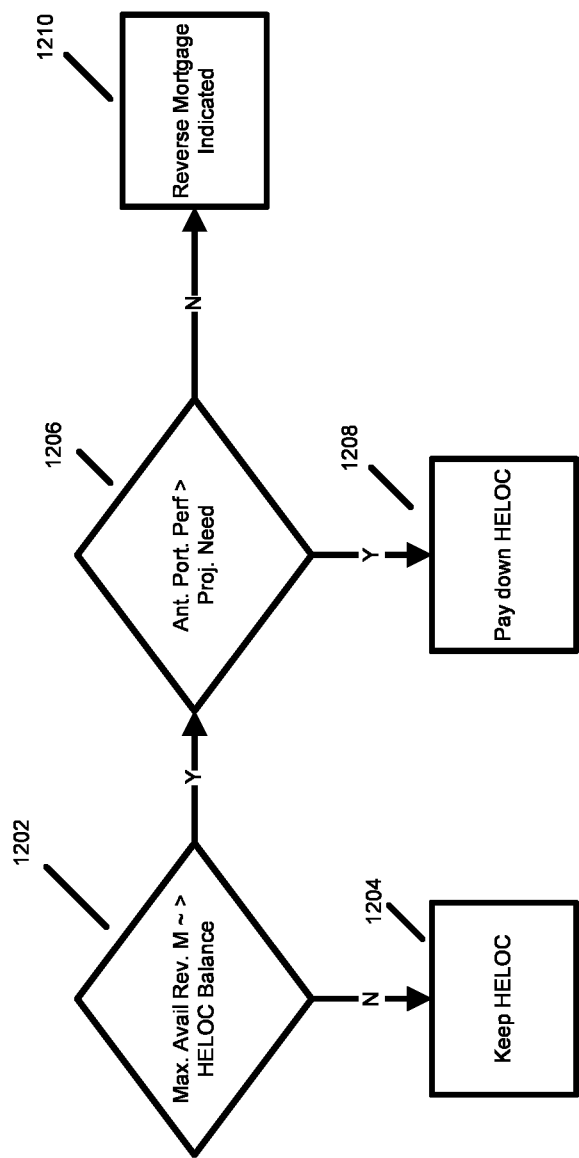
FIG. 12 depicts an embodiment of a method for determining funding allocation.

FIG. 12 depicts an embodiment of a method for determining funding allocation. In step 1202 the maximum available reverse mortgage is compared with the HELOC balance. If a predetermined percentage of the maximum available reverse mortgage is greater than the HELOC balance, then maintenance of the HELOC 1204 is indicated as advisable. If a predetermined percentage of the maximum available reverse mortgage is not greater than the HELOC balance, then the system can evaluate 1206 the anticipated portfolio performance as compared to the projected distribution. If the anticipated portfolio performance is greater than the projected need, then the system can advise that paying down the HELOC 1208 is indicated as advisable. If the anticipated portfolio performance is not greater than the projected need, then the system can advise that refinancing of the HELOC by a reverse mortgage 1210 is indicated as advisable.

Figure 13:
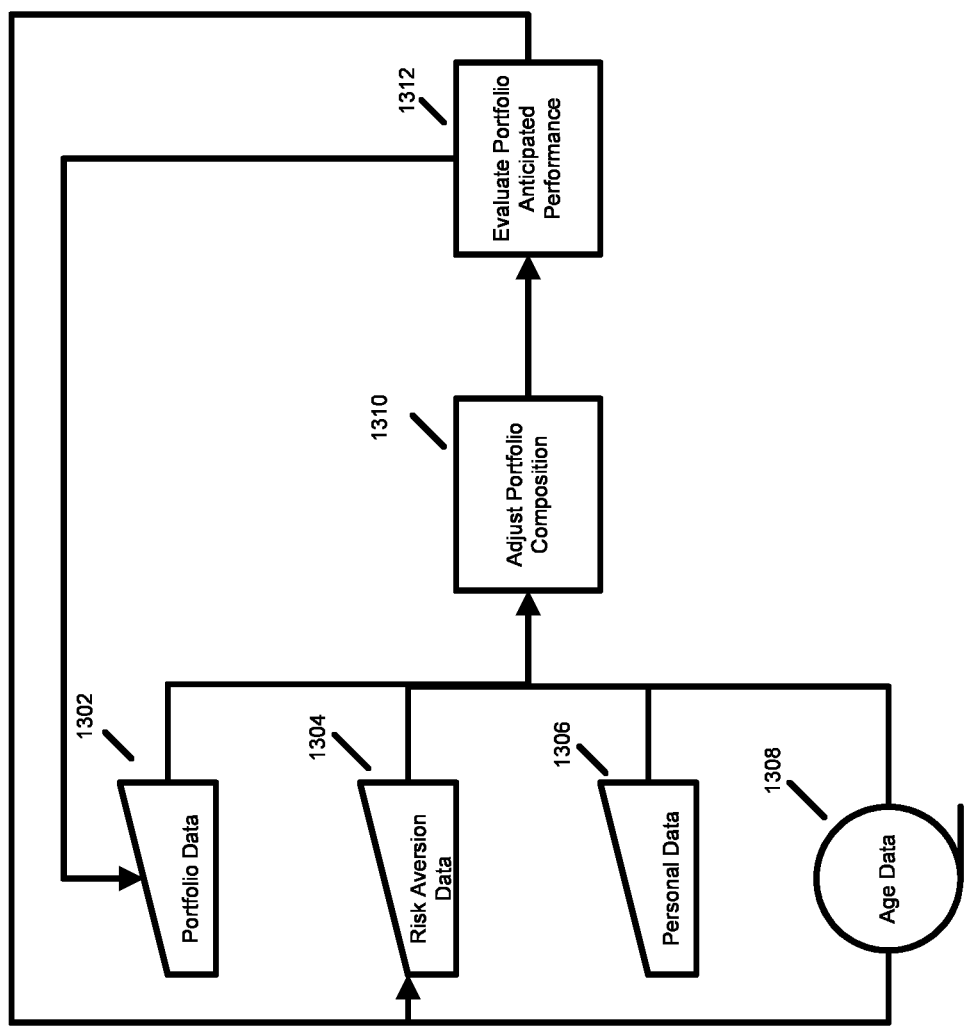
FIG. 13 depicts an embodiment of a method for evaluating anticipated performance accounting for variable risk aversion.

FIG. 13 depicts an embodiment of a method for evaluating anticipated performance accounting for variable risk aversion. In the embodiment shown in FIG. 13, various data is collected and/or generated, comprising: portfolio data 1302, risk aversion data 1304, personal data 1306 and age data 1308. Based on the input data 1302, 1304, 1306, 1308, an evaluation can be conducted using any known and/or convenient system and/or method to determine an appropriate distribution of assets within the portfolio 1310. The system can then conduct analyses to determine an anticipated portfolio performance. Such analyses can be performed using any known and/or convenient system and/or method of evaluation and the results can be used to update portfolio data and/or risk aversion data, which may be associated with age and the analyses can then be repeated with the updated values.

In operation, the system can be embodied in a spreadsheet and implemented in, at least, the following manner (this example is intended to be illustrative only and should not be construed as limiting in any manner):

Each row in the spreadsheet represents a year. The model assumes that the initial year's income draw, and each subsequent year's income draw, occurs on the last day of the year. The amount of each year's income draw is based entirely on the financial events that took place during that year.

One of the inputs to the model is the initial value of the portfolio and the asset allocation of the portfolio. During the year, the portfolio has investment gain or loss based on the investment performance of its assets. The performance of the assets during the year is Monte Carlo simulated, on the basis of historical data about the performance of the assets that make up the portfolio, and, to the extent desired by the Income Recipient or the financial planner, on the basis of any other assumptions they make. As of the end of the year, the portfolio's simulated gain or loss is determined.

Another of the inputs to the model is the amount of the initial income draw. The model determines whether the portfolio's simulated investment return is positive or negative, and if positive, it determines the amount of the investment return.

If the investment return is positive, and the amount of the investment return is at least equal to the amount of the year's income draw, the income is drawn from the portfolio. In that case, the model has the portfolio's value reduced by the amount of the income draw.

If the investment return is negative, the model has the amount of the income draw taken from the credit line. In that case, the model does not have the portfolio's value reduced by the amount of the income draw, but it does have the amount of the credit line debt increased by the value of the income draw.

The model has this process continue for each year represented by a row in the spreadsheet. For each such year, the amount of the income draw is equal to the previous year's income draw, but increased for inflation. The rate of inflation is Monte Carlo simulated, of the basis of historical data, and, if desired by the Income Recipient or the financial planner, on the basis of any other assumptions they make.

The model also adds interest to the credit line debt, at a rate determined as an input or at a rate correlated with the interest Monte Carlo simulated for the short term bond portion of the portfolio.

The model tracks the portfolio's value through the sequence of years, and notes its value at the end of numbers of years selected by the Income Recipient, e.g., 20 years, 25 years, 30 years and 35 years.

In typical Monte Carlo simulation fashion, the System runs hundreds or thousands of spreadsheets in a few minutes and shows the number of them that have portfolio values in stated ranges, at the end of each of the chosen duration periods. The number of them that have portfolio values at or near zero, divided by the total number of spreadsheets run, gives the probability of portfolio exhaustion.

The model also tracks the Income Recipient's "residual net worth" through the same time periods. The "residual net worth" in this context is defined as the value of the portfolio plus the value of the home (assumed to increase at an average rate that is another input) minus the cumulative credit line debt.

The model also has an algorithm that takes as input the total amount allowable as a reverse mortgage, as a function of the age of the Income Recipient. For each year in a spreadsheet run, it compares the amount of cumulative credit line debt against the amount available as a reverse mortgage at the age which the Income Recipient would have attained in the year when the credit line should be refinanced or paid off, analyzes the amount available in the portfolio, and "decides" whether there are sufficient assets in the portfolio to pay off the credit line and still continue the income draws at the anticipated rate. If there are not sufficient assets, the program "decides" to refinance the credit line with a reverse mortgage, and then uses the reverse mortgage interest rate (plus initial fee) in determining the cumulative debt.

The model also runs a parallel program, identical to what has been described above, but with the addition of an algorithm which reviews the cumulative investment return of the portfolio for a recent period of a predetermined number of years, and if it is greater than a predetermined amount, the excess is used to pay down the cumulative credit line debt. The probabilities of portfolio exhaustion, and the Income Recipient's residual net worth, with and without the use of the algorithm are compared.

The model also runs a parallel program, identical to what has been described above, but with the addition of an algorithm that shifts the asset allocation from one that is predominantly equities to one that is predominantly fixed income securities as the Income Recipient ages. The probabilities of portfolio exhaustion, and the Income Recipient's residual net worth, with and without the use of the algorithm are compared.

Figure 14:
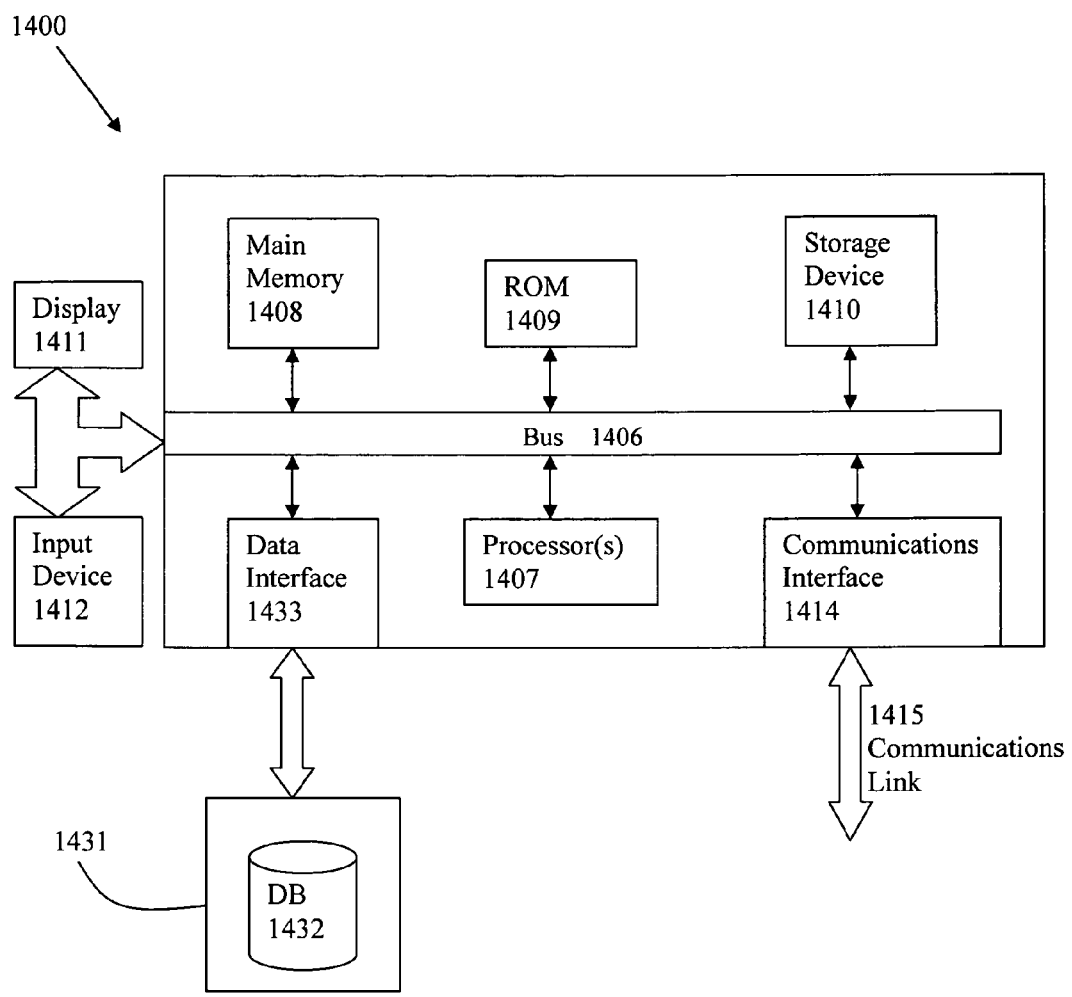
FIG. 14 depicts an embodiment of a computer system on which the methods of FIGS. 1-13 can be implemented.

The execution of the sequences of instructions required to practice the embodiments may be performed by a computer system 1400 as shown in FIG. 14. In an embodiment, execution of the sequences of instructions is performed by a single computer system 1400. According to other embodiments, two or more computer systems 1400 coupled by a communication link 1415 may perform the sequence of instructions in coordination with one another. Although a description of only one computer system 1400 will be presented below, however, it should be understood that any number of computer systems 1400 may be employed to practice the embodiments.

A computer system 1400 according to an embodiment will now be described with reference to FIG. 14, which is a block diagram of the functional components of a computer system 1400. As used herein, the term computer system 1400 is broadly used to describe any computing device that can store and independently run one or more programs.

Each computer system 1400 may include a communication interface 1414 coupled to the bus 1406. The communication interface 1414 provides two-way communication between computer systems 1400. The communication interface 1414 of a respective computer system 1400 transmits and receives electrical, electromagnetic or optical signals, that include data streams representing various types of signal information, e.g., instructions, messages and data. A communication link 1415 links one computer system 1400 with another computer system 1400. For example, the communication link 1415 may be a LAN, in which case the communication interface 1414 may be a LAN card, or the communication link 1415 may be a PSTN, in which case the communication interface 1414 may be an integrated services digital network (ISDN) card or a modem, or the communication link 1415 may be the Internet, in which case the communication interface 1414 may be a dial-up, cable or wireless modem.

A computer system 1400 may transmit and receive messages, data, and instructions, comprising program, i.e., application, code, through its respective communication link 1415 and communication interface 1414. Received program code may be executed by the respective processor(s) 1407 as it is received, and/or stored in the storage device 1410, or other associated non-volatile media, for later execution.

In an embodiment, the computer system 1400 operates in conjunction with a data storage system 1431, e.g., a data storage system 1431 that contains a database 1432 that is readily accessible by the computer system 1400. The computer system 1400 communicates with the data storage system 1431 through a data interface 1433. A data interface 1433, which is coupled to the bus 1406, transmits and receives electrical, electromagnetic or optical signals, that include data streams representing various types of signal information, e.g., instructions, messages and data. In embodiments, the functions of the data interface 1433 may be performed by the communication interface 1414.

Computer system 1400 includes a bus 1406 or other communication mechanism for communicating instructions, messages and data, collectively, information, and one or more processors 1407 coupled with the bus 1406 for processing information. Computer system 1400 also includes a main memory 1408, such as a random access memory (RAM) or other dynamic storage device, coupled to the bus 1406 for storing dynamic data and instructions to be executed by the processor(s) 1407. The main memory 1408 also may be used for storing temporary data, i.e., variables, or other intermediate information during execution of instructions by the processor(s) 1407.

The computer system 1400 may further include a read only memory (ROM) 1409 or other static storage device coupled to the bus 1406 for storing static data and instructions for the processor(s) 1407. A storage device 1410, such as a magnetic disk or optical disk, may also be provided and coupled to the bus 1406 for storing data and instructions for the processor(s) 1407.

A computer system 1400 may be coupled via the bus 1406 to a display device 1411, such as, but not limited to, a cathode ray tube (CRT), for displaying information to a user. An input device 1412, e.g., alphanumeric and other keys, is coupled to the bus 1406 for communicating information and command selections to the processor(s) 1407.

According to one embodiment, an individual computer system 1400 performs specific operations by their respective processor(s) 1407 executing one or more sequences of one or more instructions contained in the main memory 1408. Such instructions may be read into the main memory 1408 from another computer-usable medium, such as the ROM 1409 or the storage device 1410. Execution of the sequences of instructions contained in the main memory 1408 causes the processor(s) 1407 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 1407. Such a medium may take many forms, comprising, but not limited to, non-volatile, volatile and transmission media. Non-volatile media, i.e., media that can retain information in the absence of power, includes the ROM 1409, CD ROM, magnetic tape, and magnetic discs. Volatile media, i.e., media that can not retain information in the absence of power, includes the main memory 1408. Transmission media includes coaxial cables, copper wire and fiber optics, comprising the wires that comprise the bus 1406. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. Additionally, it will be apparent to those skilled in the art that the various components and systems described can be implemented in conjunction with each other and can be combined to create various systems operating in numerous manners and modes. The specification and drawings are, accordingly, to be regarded in an illustrative rather than restrictive sense.

What is claimed is:

1. A financial computing tool, comprising:
    a microprocessor coupled with a memory, an input, and an output;
    wherein said memory receives user data, home value data, portfolio data, and performance data;
    wherein said microprocessor determines available funds for at least one of a reverse mortgage and a home equity line of credit in response to said user data and said home value data stored in said memory;
    wherein said memory receives said available funds data;
    wherein said microprocessor determines at least one desired funding source in response to said portfolio data, said performance data, and said available funds data stored in said memory;
    wherein said memory receives said at least one desired funding source data;
    wherein said microprocessor determines an advised amount of funding to withdraw from each of the portfolios associated with said portfolio data and at least one of said reverse mortgage and said home equity line of credit; and
    wherein said memory receives said advised amount of funding to withdraw data.

2. The tool of claim 1 wherein said microprocessor updates at least one of said portfolio data and said home value data in response to said advised amount of funding to withdraw data stored in said memory.

3. The tool of claim 1 wherein said user data comprises an age of a user, and wherein said microprocessor determines said available funds for a reverse mortgage data in response to, at least in part, said age obtained from said user data stored in said memory.

4. The tool of claim 3 wherein said available funds from a reverse mortgage data is proportionally related to said age obtained from said user data.

5. The tool of claim 4 further comprising:
    distributing said advised amount of funding to withdraw from each of the portfolios associated with said portfolio data and at least one of said reverse mortgage and said home equity line of credit.

6. A method of determining a funding source combination from which to withdraw retirement income, comprising:
    electronically receiving user data on a computer readable medium;
    electronically receiving home value data on said computer readable medium;
    electronically receiving portfolio data on said computer readable medium;
    electronically receiving performance data on said computer readable medium;
    electronically determining available funds for at least one of a reverse mortgage and a home equity line of credit, based on said user data and said home value data;
    electronically determining at least one desired funding source based at least in part on said determined available funds, said portfolio data and said performance data;
    electronically determining an advised amount of funding to withdraw from each of the portfolios associated with said portfolio data and at least one of said reverse mortgage and said home equity line of credit;
    wherein said advised amount of funding to withdraw is distributed.

7. The method of claim 6 further comprising:
    electronically updating at least one of said portfolio data and said home value data based upon said step electronically determining an advised amount of funding to withdraw.

8. The method of claim 6 wherein said step of electronically determining available funds for a reverse mortgage is determined at least in part on an age obtained from said user data.

9. The method of claim 8 wherein said available funds from a reverse mortgage is proportionally related to said age obtained from said user data.

* * * * *